United States Patent [19]
Benjamin et al.

[11] 3,738,767
[45] June 12, 1973

[54] ADJUSTABLE BORING BAR
[75] Inventors: Milton L. Benjamin; Wilbur N. Miles, both of Chagrin Falls, Ohio
[73] Assignee: Erickson Tool Company, Solon, Ohio
[22] Filed: July 15, 1971
[21] Appl. No.: 162,851

[52] U.S. Cl.................. 408/161, 408/168, 408/179
[51] Int. Cl...................... B23b 29/034, B23b 51/00
[58] Field of Search ................. 408/155, 154, 157, 408/161, 168, 153, 179, 185, 714

[56] References Cited
UNITED STATES PATENTS
| | | | |
|---|---|---|---|
| 914,328 | 3/1909 | Barnes | 408/168 |
| 2,003,402 | 6/1935 | Thomas | 408/157 |
| 655,600 | 8/1900 | Brown | 408/154 |
| 1,024,656 | 4/1912 | Sprink | 408/168 |

FOREIGN PATENTS OR APPLICATIONS
258,641  0/0000  Switzerland........................ 408/161

*Primary Examiner*—Gil Weidenfeld
*Attorney*—Oberlin, Maky, Donnelly & Renner

[57] ABSTRACT

An adjustable boring bar characterized in that the bar has a transverse bore in which the overlapped shank portions of a pair of cutter elements are simultaneously moved radially outward or inward with respect to the longitudinal axis of the bar by screw actuated cam means which engages inclined surfaces of the respective shank portions. The screw actuated cam means comprises a nut movable in another transverse bore in the bar by rotation of a dial screw, said nut having an inclined cam face which engages a cam plunger which is longitudinally movable in a central longitudinal bore in the bar, said plunger having a V-shaped tongue which engages the respective inclined surfaces of the shank portions of the cutter elements. The adjustable boring bar herein is further characterized in that the cutter elements are of T-shaped configuration with the shanks overlapped as aforesaid in a transverse bore in the bar and with the crossbar portions guided and supported by integral shoulders formed on the bar, the cross bar portions having provision for mounting of carbide or like inserts.

4 Claims, 5 Drawing Figures

PATENTED JUN 12 1973   3,738,767

INVENTORS
MILTON L. BENJAMIN
WILBUR N. MILES

Oberlin, Maky, Donnelly & Renner
ATTORNEYS

ADJUSTABLE BORING BAR

SUMMARY OF THE INVENTION

Contrary to the foregoing, the present adjustable boring bar embodies a pair of diametrically opposite cutter elements which are simultaneously adjusted simply by turning a dial screw in either direction, the adjustment mechanism being self-locking so as to maintain desired adjustment without requiring a lock screw or the like. The provision of two diametrically opposite cutter elements enables doubling of the recommended lead for precision boring operations or enables improved quality of bored holes if recommended leads are used.

DISCUSSION OF THE INVENTION

Figure 1:
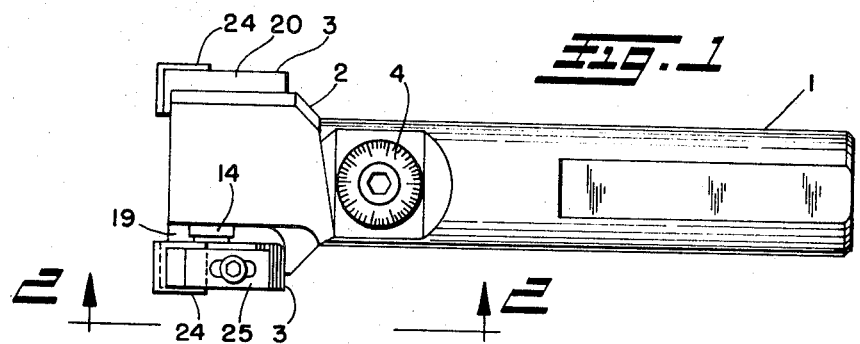
FIG. 1 is a top plan view of an adjustable boring bar embodying the present invention.
Figures 2, 3:
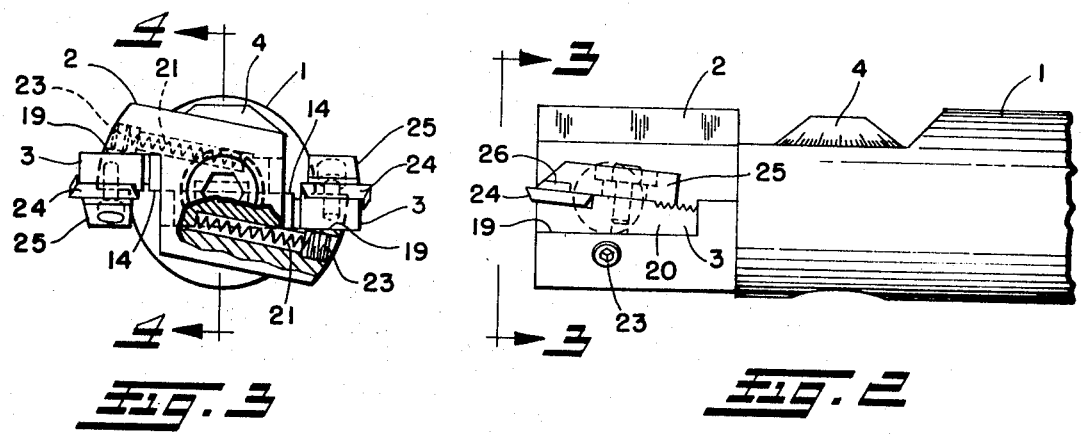
FIG. 2 is a side elevation view on enlarged scale as viewed along the line 2—2, FIG. 1.
FIG. 3 is an end elevation view partly in cross-section as viewed along the line 3—3, FIG. 2.
Figure 4:
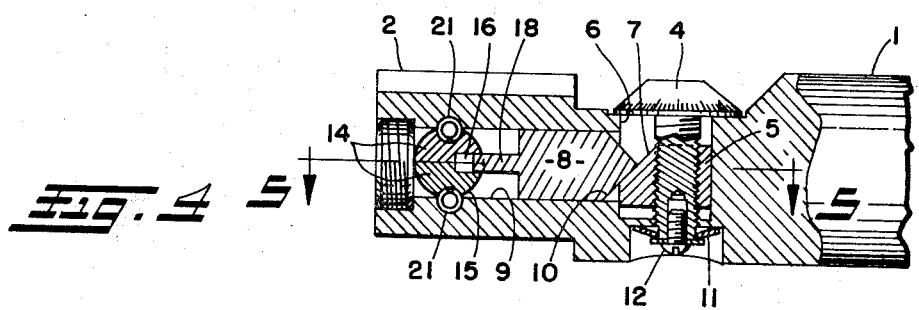
FIG. 4 is a cross-section view taken substantially along the line 4—4, FIG. 3.
Figure 5:
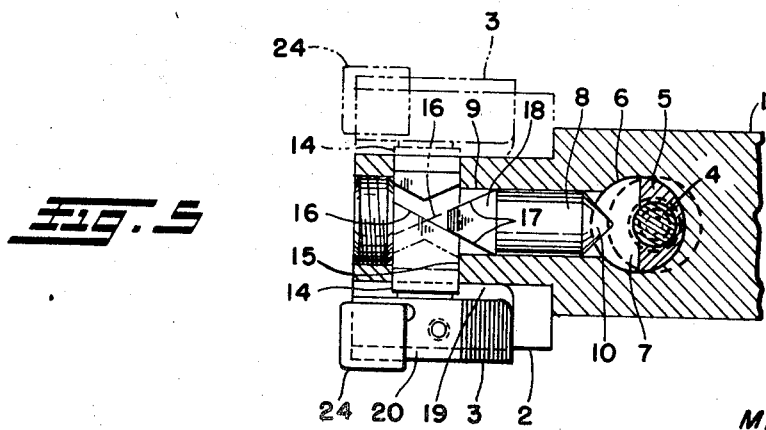
FIG. 5 is a cross-section view taken substantially along the line 5—5, FIG. 4.

The boring bar 1 herein has a head portion 2 in which the cutter elements 3;3 are radially adjustable simultaneously by turning a dial screw 4 which is rotatable with respect to a nut 5 movable in the transverse bore 6 in said bar adjacent the head portion 2 thereof. As best shown in FIGS. 4 and 5, the threads in the nut 5 are eccentrically disposed with respect to the axis of the transverse bore 6 so that the nut 5 may be of cylindrical form but yet be nonrotatable in the bore 6, whereby its inclined cam face 7 will always be disposed in the position shown so as to move the cam plunger 8 in the longitudinal bore 9 in the head portion 2, said plunger 8 having a conical rear end 10 engaged with the cam face 7. The dial screw 4 is firmly seated against the bar 1 by means of the spring washer 11 which is nonrotatable on the dial screw 4 and which is retained by screw 12.

The cutter elements 3 are of T-shaped configuration having axially overlapping semi-cylindrical shank portions 14 which are sildable in the transverse bore 15 through the head portion 2, the mating faces of the shank portions 14 defining a pocket having oppositely inclined faces 16 engaged with the corresponding inclined faces 17 of the tongue 18 of the cam plunger 8. When the dial screw 4 is turned in a direction to move the nut 5 upwardly as viewed in FIG. 4, the cam plunger 8 will be moved to the left in the longitudinal bore 9 to cause the tongue 18 to force the cutter elements 3 radially outwardly by engagement of the inclined faces 17 of the tongue 18 with the respective inclined faces 16 of the shank portions 14.

The head portion 2 is formed with guide and support shoulders 19 to support the cross bar portions 20 of the cutter elements 3 against cutting pressure and rotation. The shank portions 14 are formed with pockets in which are disposed springs 21 backed up by set screws 23 in said head portion 2, which springs 21 are constantly operative to maintain the inclined faces 16 in engagement with the opposite inclined faces 17 of the cam plunger tongue 18, and this if the dial screw 4 is turned in a direction to move the nut 5 downwardly, the springs 21 will urge the cutter elements 3 radially inwardly to maintain engagement with the tongue 18 and to maintain engagement of the plunger cam surface 10 with the beveled cam surface 7 of the nut 5.

Each cutter element 3 at the front end of the cross bar portion 20 thereof is formed with a recess in which is disposed an indexible insert 24 of cemented carbide or the like which is held in place as by means of the screw actuated clamp 25, and if desired, a chip breaker insert 26 may be embodied in the clamp 25. The clamp 25 is adjusted with respect to the cutting edge of the insert as by means of serrations thereof meshing in serrations of the cross bar portion 20 of the cutter element 3. By way of example, the indexible insert 24 is of square form to provide four cutting edges so that when one cutting edge wears, the clamp 25 may be loosened and the insert 24 indexed to provide a new cutting edge. In the case of boring in a cast iron workpiece where a 0° rake angle is preferred, such square insert would provide eight cutting edges. As apparent, the insert 24 may be of other form well known in the art such as triangular, diamond shaped, pentagon, hexagon, octagon, etc. Moreover, such inserts 24 are available with positive back rake, neutral back rake (0°) or negative back rake; also inserts 24 having different front clearance angles are available, and form no part of the present invention. Moreover, the inserts may be brazed in place or may be held by cam means, by screws therethrough, or by other expedients known in the art.

The dial screw 4 and nut 5 threads are preferably of 40 pitch, whereby when the nut bevel 7 is 45°, the plunger 8 will be moved 0.025 inch per revolution of the dial screw 4. When the angle of the inclined faces 16 and 17 is 26° 34' with respect to the longitudinal axis of the boring bar 1, each cutter element 3 will be moved radially 0.0125 inch per revolution of the dial screw 4 and hence if the dial screw 4 has 50 divisions therearound, each division will represent a 0.001 inch change in diameter across the cutting edges of the inserts 24. The nut 5, the cam plunger 8, and the shank portions 14 of the cutter elements 3 are all preferably close sliding fits in the respective bores 6, 9, and 15 so that accurate adjustment is maintained without requiring separate lock means. If greater accuracy in setting of the dial screw 4 are desired the bar 1 may have a vernier scale thereon.

As aforesaid, the dial screw 4 is frictionally seated in the boring bar 1 and the springs 21 acting on the cutter elements 3 take up any play in the nut 5 and dial screw 4 threads so that the cutter elements 3 may be adjusted radially outward or inward without affecting the accuracy of adjustment.

Generally, the distance across the cutting edges of the inserts 24 will be set by using a micrometer, a test hole will be bored and measured, and then the dial screw 4 will be turned a predetermined angle by dial divisions to obtain the final accurate adjustment.

The embodiments of the invention in which an exclusive property or privilege is claimed are defined as follows:

1. An adjustable boring bar comprising a bar having a longitudinal bore intersected by transverse bores; a pair of cutter elements movable lengthwise in a first transverse bore and having cutting edges at their radially outer extremities; screw actuated cam means in a second transverse bore; a cam plunger movable lengthwise in said longitudinal bore and having engagement with said cam means and with said cutter elements to move the latter in said one transverse bore responsive to actuation of said cam means; said cam means comprising a nut having a beveled cam face engaging a tapered end of said plunger, and a screw operative, when turned, to move said nut lengthwise in said second bore; said nut being restrained against rotation in said second bore by eccentric disposition of the interengaged threads of said nut and screw.

2. The adjustable boring bar of claim 1 wherein said screw has a radially enlarged dial means at one end and a spring washer at the other end which bears on said bar to urge said dial means into frictional engagement with said bar.

3. An adjustable boring bar comprising a bar having a longitudinal bore intersected by transverse bores; a pair of cutter elements of T-shaped form having shank portions movable lengthwise in a first transverse bore and having radially outer crossbar portions with cutting edges at their radially outer extremities; said bar having shoulders engaged by the respective crossbar portions to guide said elements during adjustment and to support them when work load is imposed on said cutting edges; said cutting edges being formed on indexible inserts; means on said crossbar portions for securing said inserts on the axially forward portions thereof; screw actuated cam means in a second transverse bore; a cam plunger movable lengthwise in said longitudinal bore and having engagement with said cam means and with said cutter elements to move the latter in said one transverse bore responsive to actuation of said cam means.

4. The adjustable boring bar of claim 3 wherein said means on said crossbar portions comprise screw-actuated clamps operative to clamp said inserts to the respective cross-bar portions.

* * * * *